(12) United States Patent
Suda

(10) Patent No.: US 6,903,774 B2
(45) Date of Patent: Jun. 7, 2005

(54) VIEWFINDER DEVICE INCLUDING FIRST AND SECOND PRISMS TO REFLECT LIGHT FROM OUTSIDE THE VIEWING AREA

(75) Inventor: Yasuo Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 09/808,596

(22) Filed: Mar. 14, 2001

(65) Prior Publication Data

US 2001/0043280 A1 Nov. 22, 2001

(30) Foreign Application Priority Data

Mar. 15, 2000 (JP) ........................................ 2000-071668

(51) Int. Cl.[7] .............................................. H04N 5/225
(52) U.S. Cl. ..................... 348/341; 348/335; 348/337; 348/338; 359/366; 396/382; 396/384
(58) Field of Search ................................ 348/337, 338, 348/341, 335, 340, 333.04, 333.09; 359/366, 709, 732, 726; 396/385, 386, 373, 384

(56) References Cited

U.S. PATENT DOCUMENTS

| | | | | | |
|---|---|---|---|---|---|
| 3,911,457 A | * | 10/1975 | Okuno | ........................ | 396/384 |
| 3,952,321 A | * | 4/1976 | Matui | .......................... | 396/384 |
| 4,118,722 A | * | 10/1978 | Matsui | ........................ | 396/281 |
| 4,682,237 A | * | 7/1987 | Kato et al. | .................. | 348/341 |
| 5,701,203 A | * | 12/1997 | Watanabe | .................... | 359/669 |

* cited by examiner

*Primary Examiner*—Wendy R. Garber
*Assistant Examiner*—Chriss S. Yoder
(74) *Attorney, Agent, or Firm*—Cowan, Liebowitz & Latman, P.C.

(57) ABSTRACT

A thin viewfinder device includes, in order an object side to a viewing eye side, a first prism, and a second prism disposed separately from the first prim across an air gap. The first prism, the air gap and the second prism are arranged in such a manner that an object light flux obtained within a viewing field passes through the first prism, the air gap and the second prism so as to reach the viewing eye, while an object light flux obtained outside the viewing field is totally reflected by surfaces of the first prism so as to be prevented from reaching the viewing eye.

11 Claims, 14 Drawing Sheets

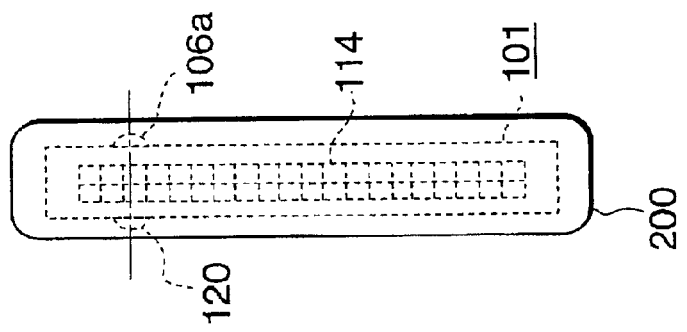
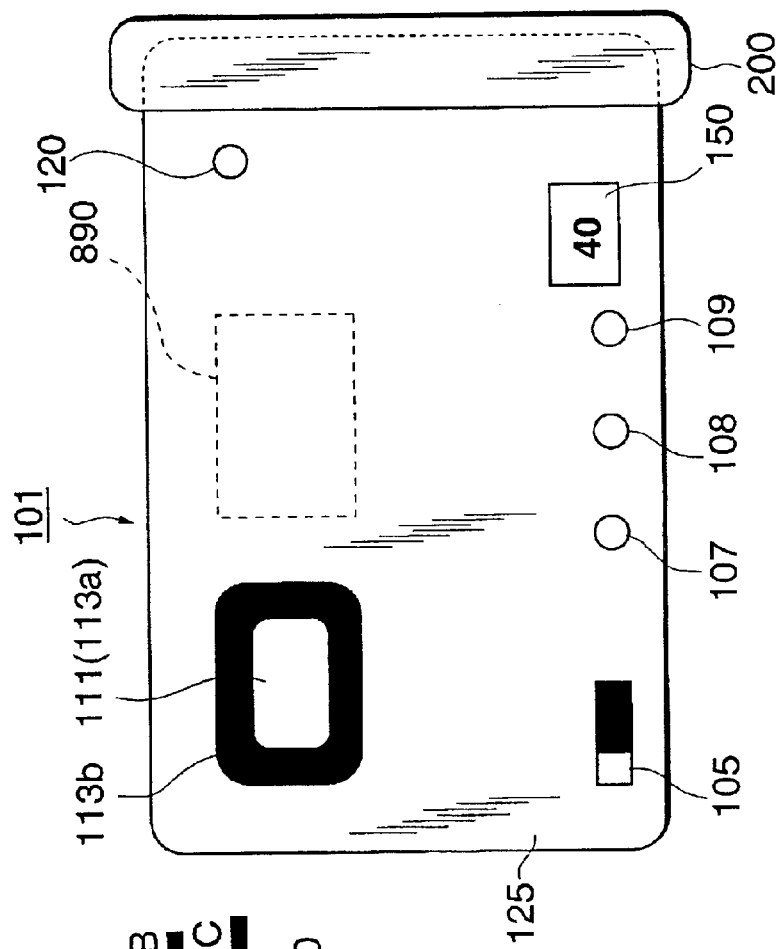
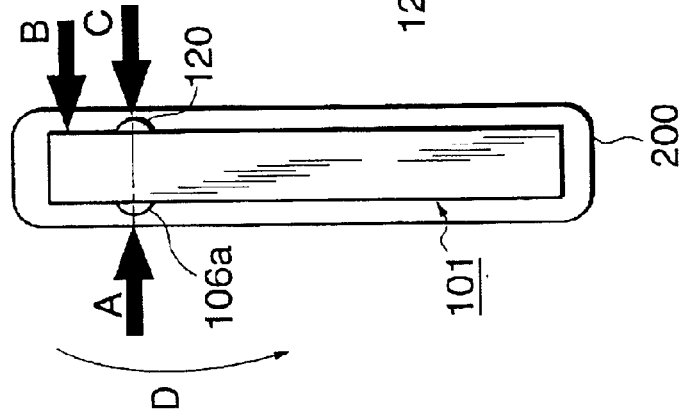

US 6,903,774 B2

VIEWFINDER DEVICE INCLUDING FIRST AND SECOND PRISMS TO REFLECT LIGHT FROM OUTSIDE THE VIEWING AREA

BACKGROUND OF THE INVENTION

1. Field of the Invention

The present invention relates to a viewfinder device and to an optical apparatus using the viewfinder device, which is adapted for a small-sized camera of the kind having a solid-state image sensor, such as a digital still camera or a video movie camera, etc.

2. Description of Related Art

The optical apparatuses, such as digital color cameras, are arranged to expose a solid-state image sensor, such as a CCD or CMOS sensor, to light of an object image for a desired period of time in response to a pushing operation on a release button, to convert an image signal which represents a still image of one picture plane obtained by the exposure into a digital image signal, and to obtain an image signal of a prescribed format by subjecting the digital image signal to a process such as a YC process. Digital image signals indicating images picked up and obtained in this manner are recorded in a semiconductor memory one by one. The image signals thus recorded are read out and reproduced in such a signal form that can be displayed or printed. The reproduced signals are then outputted to be displayed on a monitor or the like.

Since a small-sized solid-state image sensor is used for the digital color camera, the use of it facilitates reduction in thickness of the camera. According to the arrangement disclosed in Japanese Laid-Open Patent Application No. Hei 10-126658, camera functions of varied kinds are stored in a card-shaped storage of the size of PC card. This storage is arranged to be accessible by such an external information processing apparatus represented typically by a personal computer by inserting it into a card slot provided in the external information processing apparatus. There is also disclosed the arrangement for providing the camera with a folding-type viewfinder device.

The arrangement of the viewfinder device disclosed in Japanese Laid-Open Patent Application No. Hei 10-126658, however, necessitates some moving parts as a viewfinder optical path is arranged to be formed only when the folding-type viewfinder device is to be used. The arrangement, therefore, tends to result in a complex structure of the camera. Besides, the viewfinder device must be folded every time the camera is to be inserted into the card slot of the external information processing apparatus.

Viewfinders of varied kinds have heretofore been used for small-sized cameras, including an inverted Galilean viewfinder, an Albada viewfinder, a mark viewfinder, a real image viewfinder, etc.

However, each of the viewfinders conventionally adapted for small-sized cameras respectively have some problems, and none of them have been sufficiently satisfactory.

For example, the inverted Galilean viewfinder gives a vague contour of a viewfinder field although its structural arrangement is simple.

The Albada viewfinder and the mark viewfinder give a dark field (viewfinder image) because of use of a half-mirror disposed in the optical path of the viewfinder.

Each of the inverted Galilean viewfinder, the Albada viewfinder and the mark viewfinder is composed of a lens system which is close to an afocal system. The viewfinder, therefore, cannot be formed with one thin lens as it must be formed by arranging at least two lenses away from each other. Reduction in thickness of the viewfinder is, therefore, hardly possible.

The real image type viewfinder gives clear contour of a viewfinder field. However, it necessitates use of a Porro prism besides the use of a plurality of objective lenses and eyepieces. The structural arrangement of the viewfinder of this type is, therefore, complex.

These problems have made it difficult to arrange a viewfinder device apposite to a small-sized camera in such a way as to have a simple structure and yet to give a bright field with a clear contour of the field.

BRIEF SUMMARY OF THE INVENTION

It is an object of the invention to provide a thin viewfinder device without any moving part and an optical apparatus using the thin view finder device.

It is another object of the invention to provide a thin viewfinder device arranged to be capable of showing a bright and adequate viewfinder image with a sharp contour of a viewfinder field, despite having no moving part.

To attain the above objects, in accordance with an aspect of the invention, there is provided a viewfinder device, comprising, in order an object side to a viewing eye side, a first prism, and a second prism disposed separately from the first prim across an air gap, wherein the first prism, the air gap and the second prism are arranged in such a manner that an object light flux obtained within a viewing field passes through the first prism, the air gap and the second prism so as to reach the viewing eye, while an object light flux obtained outside the viewing field is totally reflected by surfaces of the first prism so as to be prevented from reaching the viewing eye.

In particular, in the viewfinder device, the first prism is in a convex shape protruding toward the viewing eye, and a part of the second prism on the object side is in a concave shape which is analogous to the convex shape.

In the viewfinder device, a composite optical power of the first prism and the second prism is nonpower.

In the viewfinder device, a surface of the first prism facing the object side is a flat surface, and a surface of the first prism facing the air gap has a flat top surface and four side surfaces forming a roof part in conjunction with the flat top surface, the four side surfaces being arranged to totally reflect the object light flux obtained outside the viewing field.

In the viewfinder device, each of the side surfaces is a curved surface.

In the viewfinder device, the side surfaces are in such shapes that are symmetrical with respect to a horizontal plane including a viewfinder optical axis.

In the viewfinder device, the side surfaces are in such shapes that are symmetrical with respect to a vertical plane including a viewfinder optical axis.

In the viewfinder device, each of the side surfaces is a flat surface.

In the viewfinder device, the air gap measures 1.4 $\mu$m or more in thickness.

In the viewfinder device, the first prism is a hexahedron in such a shape that a surface of the first prism facing the object side is in a square shape, and a top surface of a side of the first prism facing the air gap is in a square shape smaller in size than the square shape of the surface facing the object side.

In accordance with another aspect of the invention, there is provided a viewfinder device, comprising, in order from an object side to a viewing eye side, a first prism having a convex portion facing the viewing eye side, and a second prism disposed separately from the first prim across an air gap, wherein an object light flux obtained within a viewing field passes through the first prism, the air gap and the second prism so as to reach the viewing eye, while an object light flux obtained outside the viewing field is totally reflected by the convex portion of the first prism so as to be prevented from reaching the viewing eye.

The above and other objects and features of the invention will become apparent from the following detailed description of preferred embodiments thereof taken in connection with the accompanying drawings.

BRIEF DESCRIPTION OF THE SEVERAL VIEWS OF THE DRAWINGS

FIGS. 12(A), 12(B) and 12(C) are diagrams showing the whole digital color camera shown in FIG. 1 in a state of having a contact protection cap attached thereto, FIG. 12(B) being a rear view, FIG. 12(A) being a side view taken from the left side of the rear view (FIG. 12(B)), and FIG. 12(C) being a side view taken from the right side of the rear view (FIG. 12(B)).

DETAILED DESCRIPTION OF THE INVENTION

Hereinafter, preferred embodiments of the invention will be described in detail with reference to the drawings.

Figure 1:
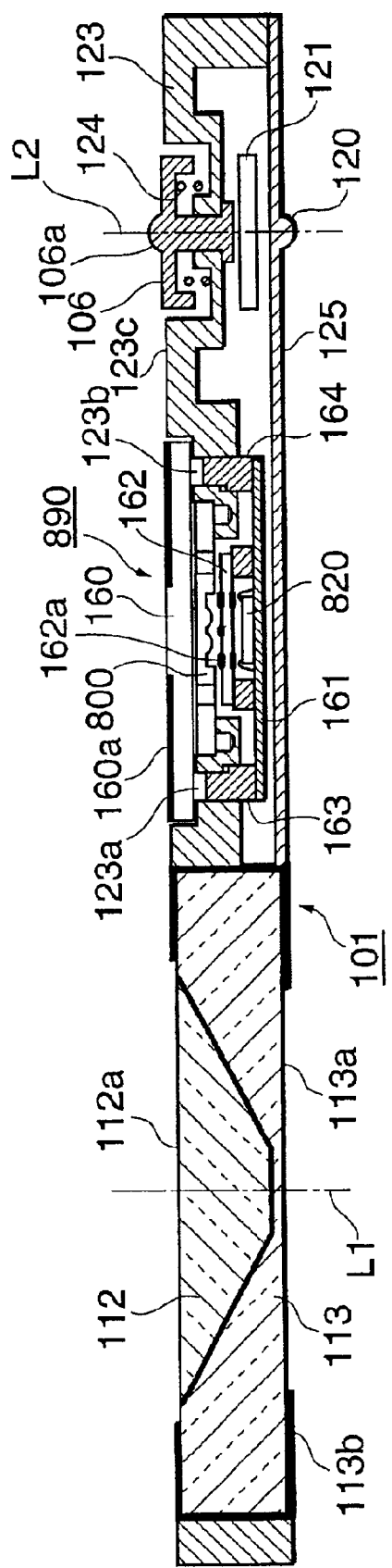
FIG. 1 is a sectional view showing a digital color camera according to a first embodiment of the invention.
Figure 2:
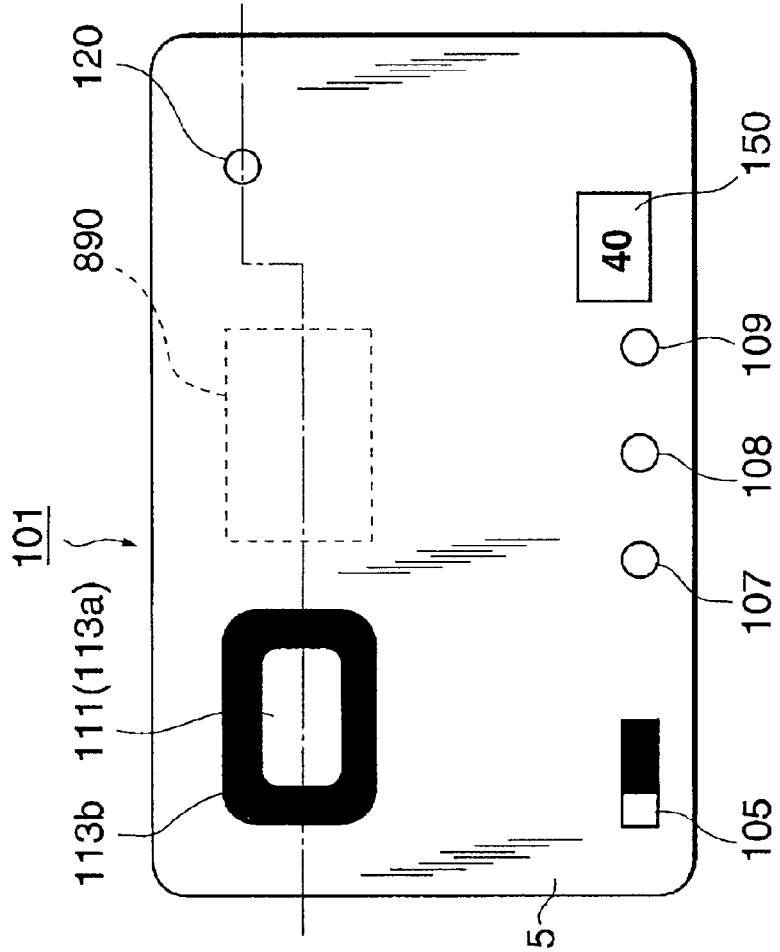
FIGS. 2(A), 2(B) and 2(C) are diagrams showing the whole arrangement of the digital color camera according to the first embodiment of the invention.

FIG. 1 is a sectional view showing essential parts of a digital color camera having a viewfinder device according to a first embodiment of the invention. FIGS. 2(A), 2(B) and 2(C) show in outline the whole arrangement of the digital color camera having the viewfinder device. Of these figures, FIG. 2(B) is a rear view, FIG. 2(A) is a side view taken from the left side of the rear view (FIG. 2(B)), and FIG. 2(C) is a side view taken from the right side of the rear view (FIG. 2(B)).

Referring to FIGS. 1, 2(A), 2(B) and 2(C), a camera body 101 is in a card-like shape. The camera is provided with a main switch 105, a release button 106, switches 107, 108 and 109 arranged to allow the user of the camera to set the camera in various states, and an indicating part 150 arranged to indicate a remaining number of frames usable for photo-taking.

A viewfinder eyepiece window 111 is arranged to allow object light incident on a viewfinder window on the object side to exit from there. A standardized connection terminal 114 is arranged to be connected to an external computer or the like to exchange data with it. A projection 120 is formed coaxially with the release button 106, which is disposed on the front side of the camera. An image pickup system 890 is disposed inside the camera body 101.

The camera body 101 may be arranged to be mounted on a personal computer by forming the camera body 101 in the same size as a PC card. In that case, the camera body 101 is arranged to measure either 85.6 mm in length, 54.0 mm in width and 3.3 mm in thickness (Type 1 of the PC card standards) or 5.0 mm in thickness (Type 2 of the PC card standards). The camera body 101 is provided with a light-blocking area 113b and a back cover 125.

The sectional view of the digital color camera shown in FIG. 1 is taken across the release button 106, the image pickup system 890 and the viewfinder eyepiece window 111 shown in FIG. 2(B). In FIG. 1, there are further illustrated a casing 123 arranged to hold the various component elements of the camera, the back cover 125, the image pickup system 890, a switch 121 arranged to turn on when the release button 106 is pushed down, and a coiled spring 124 which is arranged to urge the release button 106 to protrude outward from the camera body 101.

The switch 121 is provided with a first step circuit which is arranged to close when the release button 106 is pushed down only halfway of its full stroke and a second step circuit which is arranged to close when the release button 106 is pushed down to the end of its full stroke. The casing 123 includes a front surface 123c which is arranged on the front side of the camera as a first exterior surface. The back cover 125 is a second exterior surface of the camera.

First and second prisms 112 and 113 constitute a viewfinder optical system arranged to perform a light deflecting action.

The first and second prisms 112 and 113 are made of a transparent material, such as an acrylic resin or the like, and are arranged to have the same refractive index and to be solid to allow rays of light to rectilinearly advance inside them. The light-blocking area 113b is formed by light-blocking printing around the object light exit surface 113a of the second prism 113 in such a way as to limit the passing range of viewfinder exit light. The printed area extends from the side surfaces of the second prism 113 to the parts of the second prism 113 which are opposed to the object light exit surface 113a.

The image pickup system 890 is formed by mounting, on the casing 123, a protection glass 160, a photo-taking lens 800, a sensor base board 161 and junction members 163 and 164 for sensor position adjustment. On the sensor base board 161 are mounted a solid-state image sensor 820 and a sensor cover glass 162. The photo-taking lens 800 is provided with a diaphragm 810, which will be described later herein.

The junction members 163 and 164 are movably fitted into the through holes 123a and 123b of the casing 123 and are secured by bonding to the sensor base board 161 and the casing 123 after a positional relation between the photo-taking lens 800 and the solid-state image sensor 820 is appositely adjusted by using these junction members 163 and 164.

Further, to minimize the incidence of light on the solid-state image sensor 820 from the outside of an image pickup range, light-blocking printing is applied to all areas other than the effective areas of the protection glass 160 and the sensor cover glass 162. In FIG. 1, reference numerals 160a and 162a denote the areas to which the light-blocking printing is applied.

To avoid occurrence of ghost, a transparency-increasing coating is applied to all the areas of the protection glass 160 and the sensor cover glass 162 other than the printed areas 160a and 162a.

The details of the image pickup system (photo-taking optical system) 890 are as described below.

Figure 3:
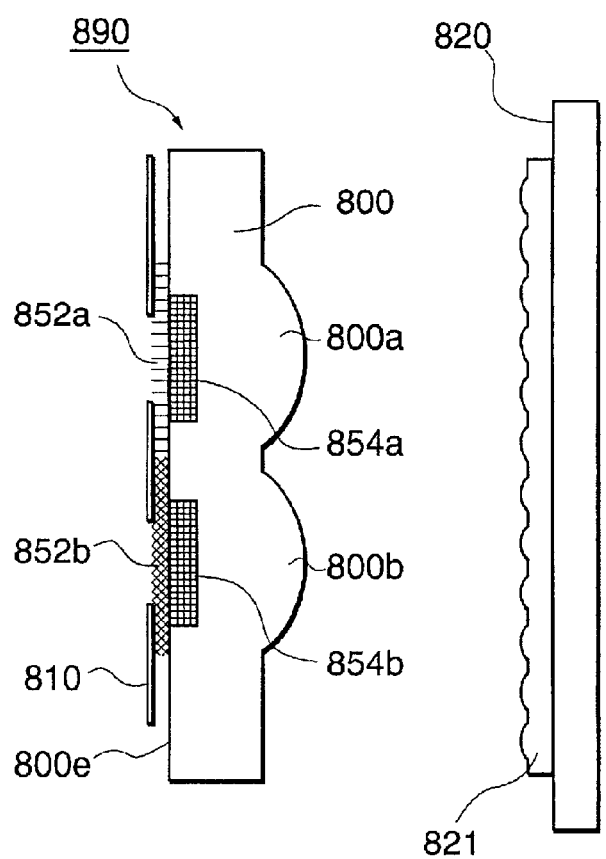
FIG. 3 is a detail view showing an image pickup system 890 shown in FIG. 1.

FIG. 3 shows in detail the arrangement of the image pickup system 890. The basic elements of the photo-taking optical system includes the photo-taking lens 800, the diaphragm 810 and the solid-state image sensor 820.

Figure 5:
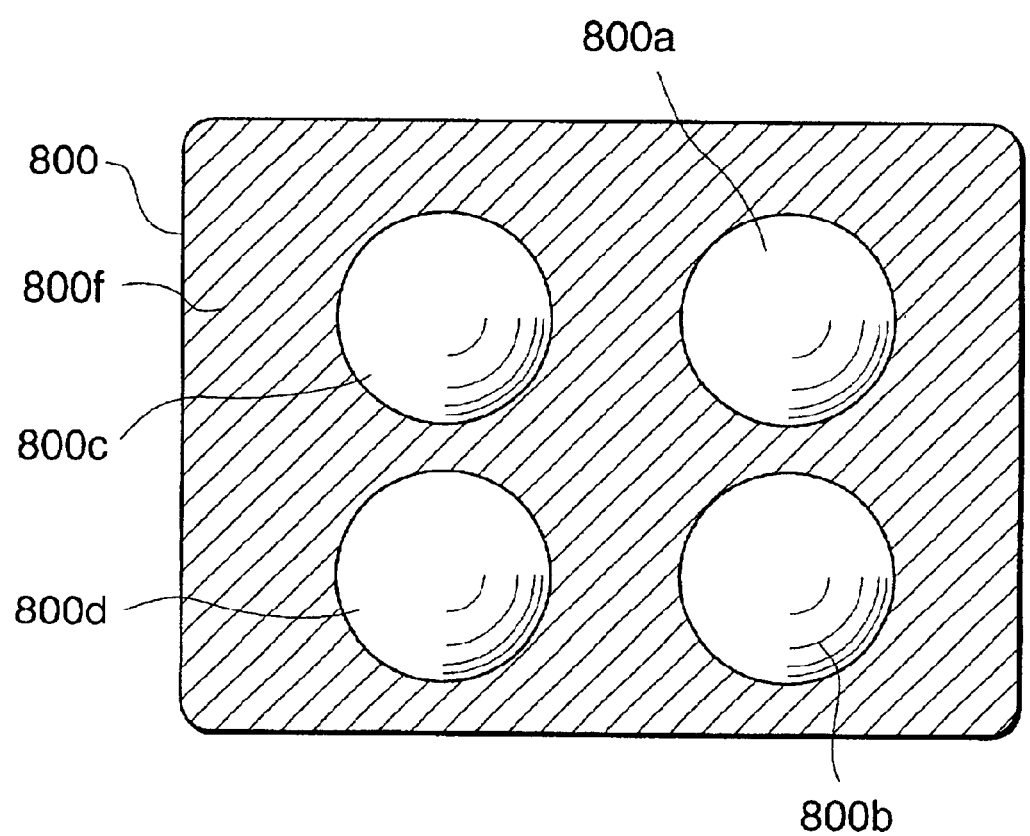
FIG. 5 is a diagram showing a photo-taking lens 800 shown in FIG. 3, as viewed from the light exit side.

FIG. 5 shows the photo-taking lens 800 as viewed from the light exit side. As shown in FIG. 5, the photo-taking lens 800 is composed of four lens parts 800a, 800b, 800c and 800d. Each of the lens parts 800a, 800b, 800c and 800d is formed to have a spherical surface or a rotationally symmetrical aspheric surface. Above the lens parts 800a, 800b, 800c and 800d, there are provided infrared-cut filters which have a low transmission factor for a wavelength region of 670 nm or more. A light-blocking film is formed at a flat surface part 800f which is indicated with hatching.

Each of the four lens parts 800a, 800b, 800c and 800d is arranged to be an image forming system.

To enhance the response of the solid-state image sensor 820 to a low-frequency side of the object image by suppressing a high-frequency component of the object image which is equal to or higher than a Nyquist frequency determined by the pitch of pixels of the solid-state image sensor 820, the photo-taking lens 800 is provided with transmission factor distribution areas 854a and 854b on its light entrance surface 800e (see FIG. 3). This arrangement is called an apodization method and is made for obtaining a desired effect of an MTF (modulation transfer function) by imparting to the photo-taking lens 800 a characteristic wherein the transmission factor is highest at the center of the diaphragm and gradually decreases toward the peripheral area of the diaphragm.

Figure 4:
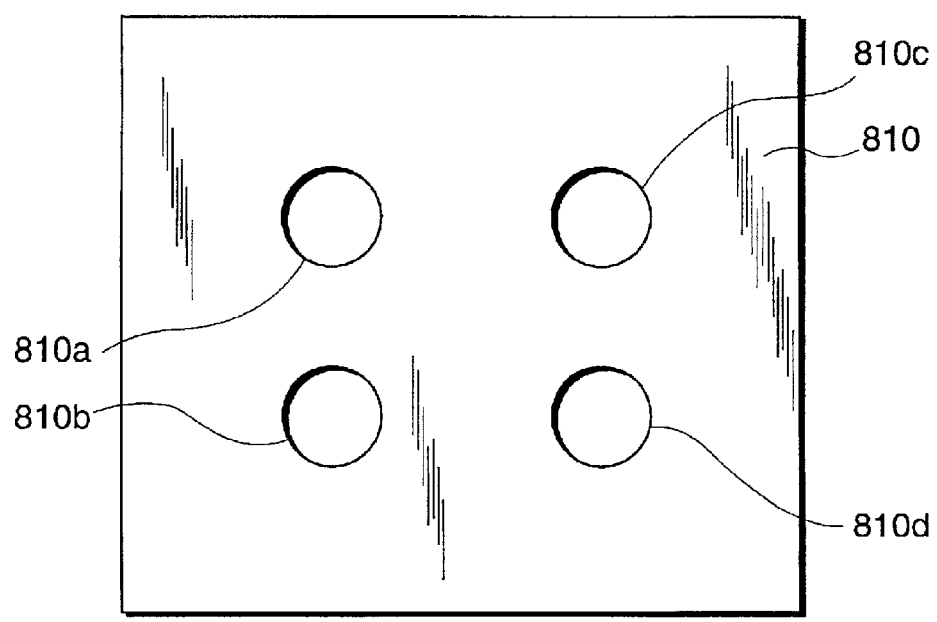
FIG. 4 is a plan view showing a diaphragm 810 shown in FIG. 3.

As shown in FIG. 4, the diaphragm 810 has four circular apertures 810a, 810b, 810c and 810d. Object light fluxes incident on the light entrance surface 800e of the photo-taking lens 800 through the apertures 810a, 810b, 810c and 810d exit from the four lens parts 800a, 800b, 800c and 800d to form four object images on the image pickup plane of the solid-state image sensor 820.

The diaphragm 810, the light entrance surface 800e and the image pickup surface of the solid-state image sensor 820 are arranged in parallel with each other.

In the first embodiment, the light entrance surface 800e of the photo-taking lens 800 is assumed to be flat. The light entrance surface, however, may be composed of four spherical surfaces or four rotationally symmetrical aspheric surfaces. Since any distortion is correctable by an arithmetic process, a characteristic to which the highest priority is to be given, from an optical viewpoint, is the curvature of field. Therefore, the positions and shapes of the light entrance surface 800e and the lens parts 800a, 800b, 800c and 800d are determined while paying attention mainly to the curvature of field.

Figure 6:
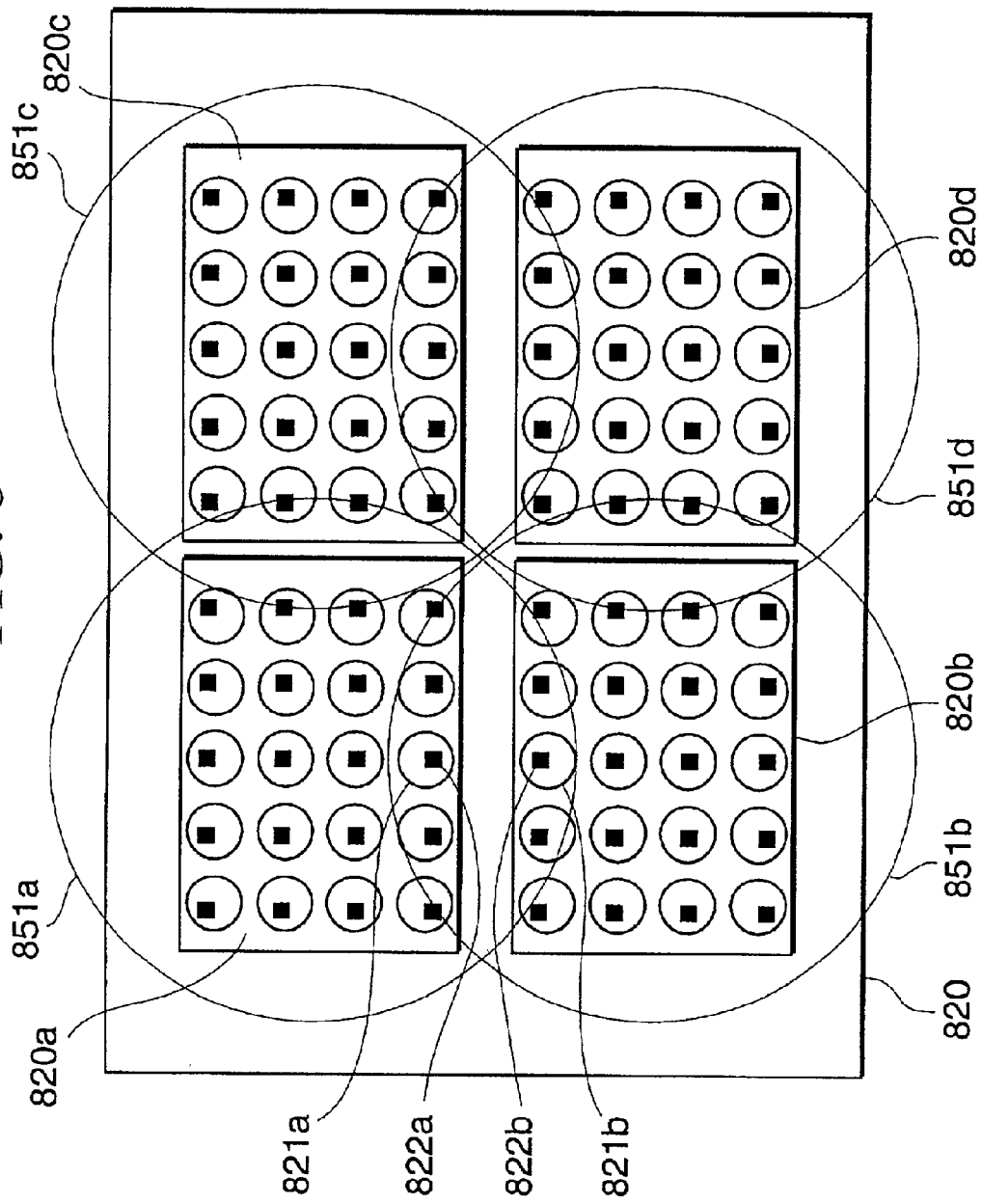
FIG. 6 is a front view showing a solid-state image sensor 820 shown in FIG. 3.

FIG. 6 is a front view of the solid-state image sensor 820. The solid-state image sensor 820 has four image pickup areas 820a, 820b, 820c and 820d for four object images to be formed. Although they are shown in a simplified state in FIG. 6, each of the image pickup areas 820a, 820b, 820c and 820d measures 2.24 mm×1.68 mm and is composed of 800×600 pixels which are arranged at vertical and horizontal pitches of 2.8 $\mu$m. Thus, each image pickup area measures 2.80 mm in diagonal dimension.

Referring to FIG. 6, image circles 851a, 851b, 851c and 851d are arranged to have images formed inside them. Each of the image circles 851a, 851b, 851c and 851d is in a circular shape determined by the size of the aperture of the diaphragm and that of the spherical surface part on the exit side of the photo-taking lens 800, although the illuminance thereof becomes lower in its peripheral area under the influence of the printed areas 160a and 162a which are provided on the protection glass 160 and the sensor cover glass 162.

The image circles 851a, 851b, 851c and 851d include some parts where they overlap each other.

Figure 7:
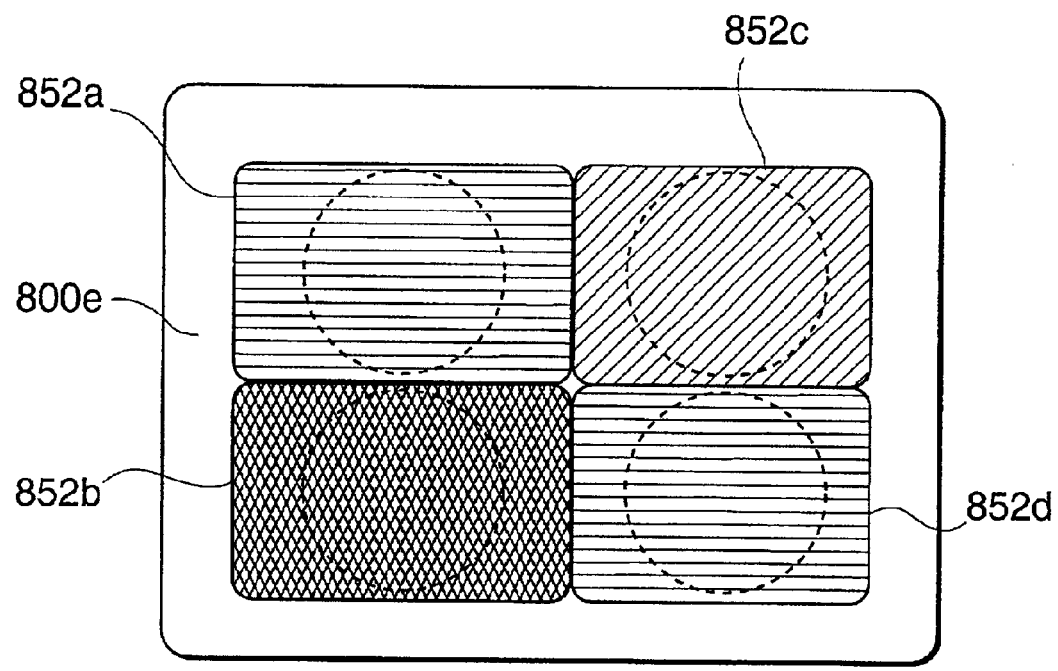
FIG. 7 is a diagram showing the photo-taking lens 800 shown FIG. 3, as viewed from the light entrance side.

Referring again to FIG. 3, parts 852a and 852b indicated by hatching between the diaphragm 810 and the photo-taking lens 800 represent optical filters formed on the light entrance surface 800e of the photo-taking lens 800. Referring to FIG. 7, which shows the photo-taking lens 800 as viewed from the light entrance side, optical filters 852a, 852b, 852c and 852d are formed to completely cover the diaphragm apertures 810a, 810b, 810c and 810d.

Figure 8:
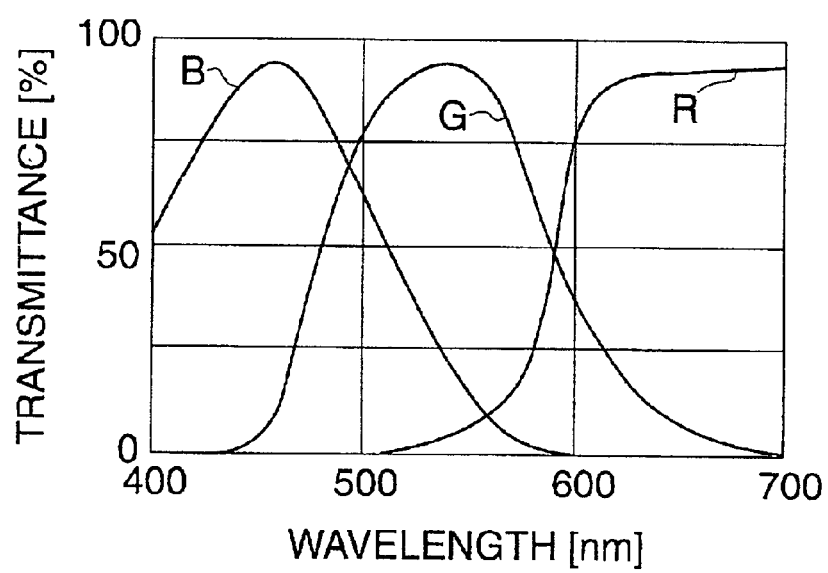
FIG. 8 is a graph showing the spectral transmission factors of optical filters 852a to 852d shown in FIG. 7.

Referring to FIG. 8, the optical filters 852a and 852d have a spectral transmission factor characteristic of mainly transmitting a green color as represented by a curve G. The optical filter 852b has a spectral transmission factor characteristic of mainly transmitting a red color as represented by a curve R. The optical filter 852c has a spectral transmission factor characteristic of mainly transmitting a blue color as represented by a curve B.

In other words, the optical filters 852a, 852b, 852c and 852d are primary color filters. As a result of the characteristic of the infrared-cut filter formed at the lens parts 800a, 800b, 800c and 800d, object images formed in the image circles 851a and 851d are formed by a green color light component, an object image formed in the image circle 851b is formed by a red color light component, and an object image formed in the image circle 851c is formed by a blue color light component.

With these image forming systems set at about the same focal length for their representative wavelengths of spectral distribution, a color image which has chromatic aberrations adequately corrected can be obtained by combining the image signals thus obtained.

Each of the image forming systems is arranged in the form of a single sheet. This arrangement greatly contributes to the reduction in thickness of the image pickup system. Since it is generally necessary for achromatism to use at least two lenses of different dispersing degrees in combination, the single-sheet arrangement has an advantageous effect also for the reduction in cost.

Optical filters are formed also on the four image pickup areas 820a, 820b, 820c and 820d of the solid-state image sensor 820. The spectral transmission factor characteristic of the image pickup areas 820a and 820d is shown by the curve G in FIG. 8, the spectral transmission factor characteristic of the image pickup area 820b is shown by the curve R in FIG. 8, and the spectral transmission factor characteristic of the image pickup area 820c is shown by the curve B in FIG. 8.

In other words, the image pickup areas 820a and 820d are sensitive to green color light (G), the image pickup area 820b is sensitive to red color light (R), and the image pickup area 820c is sensitive to blue color light (B).

Since the light receiving spectral distribution of each image pickup area is obtained as a product of the spectral transmission factor of the pupil and that of the image pickup area, a combination of the pupil of the image forming system and the image pickup area can be somehow selected by wavelength regions, even though the image circles are overlapping in part.

Microlenses 821 are formed above the image pickup areas 820a, 820b, 820c and 820d for every pixel of the light receiving parts 822a, 822b, etc.

Each of the microlenses 821 is decentered with respect to the corresponding light receiving part 822. The decentered degree is zero at the center of each of the image pickup areas 820a, 820b, 820c and 820d and increases accordingly as the light receiving part 822 is located closer to the periphery of the image pickup area. The direction of decentering is in the direction of a line segment connecting each light receiving part to the center point of each of the image pickup areas 820a, 820b, 820c and 820d.

Figure 9:
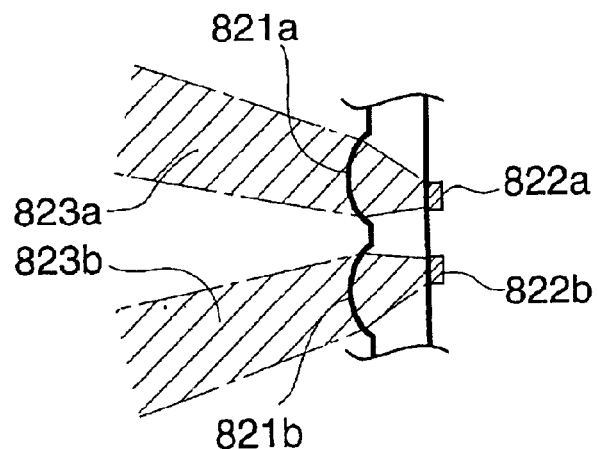
FIG. 9 is a diagram showing the action of a microlens 821 shown in FIG. 3.

FIG. 9 is a diagram for explaining the action of the microlenses 821, and is a sectional view showing in an enlarged state the light receiving parts 822a and 822b which are located where the image pickup area 820a and the image pickup area 820b are adjoining each other. As shown in FIG. 9, while the microlens 821a is decentered upward with respect to the light receiving part 822a, the microlens 821b is decentered downward with respect to the light receiving part 822b.

As a result, a light flux incident on the light receiving part 822a is limited to an area 823a indicated by hatching in FIG. 9. A light flux incident on the light receiving part 822b is limited to an area 823b indicated also by hatching in FIG. 9.

The light flux areas 823a and 823b come toward the lens parts 800a and 800b respectively in a conversely slanting state. Therefore, with the microlenses 821 decentered to apposite degrees, only such a light flux that exits from a specific pupil is allowed to fall on each image pickup area.

In other words, the decentered degree is set in such a manner that an object light flux passing through the diaphragm aperture 810a is photo-electrically converted mainly at the image pickup area 820a, an object light flux passing through the diaphragm aperture 810b is photo-electrically converted mainly at the image pickup area 820b, an object light flux passing through the diaphragm aperture 810c is photo-electrically converted mainly at the image pickup area 820c, and an object light flux passing through the diaphragm aperture 810d is photo-electrically converted mainly at the image pickup area 820d.

As described above, a pupil is selectively allotted to each image pickup area 820 by utilizing the regions of wavelength and also by utilizing the positions of the microlenses 821. Further, the printed areas are provided on the protection glass 160 and the sensor cover glass 162. By virtue of this arrangement, a crosstalk between wavelengths can be reliably prevented despite of the partial overlapping of the image circles.

In other words, the object light passing through the diaphragm aperture 810a is photo-electrically converted by the image pickup area 820a. The object light passing through the diaphragm aperture 810b is photo-electrically converted by the image pickup area 820b. The object light passing through the diaphragm aperture 810c is photo-electrically converted by the image pickup area 820c. The object light passing through the diaphragm aperture 810d is photo-electrically converted by the image pickup area 820d.

Then, a G (green) image signal is outputted from the image pickup areas 820a and 820d, an R (red) image signal is outputted from the image pickup area 820b, and a B (blue) image signal is outputted from the image pickup area 820c.

An image processing system (not shown) is arranged to form a color image on the basis of outputs of the plurality of image pickup areas of the solid-state image sensor 820 obtained by the selective photo-electric conversion. At this time, the distortion of each image forming system is corrected by an arithmetic operation, and a signal processing action is performed to form a color image on the basis of the G image signal which includes the peak wavelength 555 nm of relative luminous efficiency.

Since the object image of green color, i.e., a G image signal, is formed at the two image pickup areas 820a and 820d, the number of pixels of the G image signal is twice as much as that of the R image signal or the B image signal. Therefore, an image of a high degree of definition can be obtained particularly at a wavelength region having a high luminous efficiency.

The image signals may be processed by the so-called pixel shifting method. According to the pixel shifting method, the resolution of object images can be enhanced with a fewer number of pixels by processing the object images on the image pickup areas 820a and 820d of the solid-state image sensor 820 in such a way as to mutually shift the images to an extent of ½ pixel in both the vertical direction and the horizontal direction.

Compared with a Bayer arranging method whereby R-G-B color filters are formed with 2×2 pixels set as one group on a solid-state image sensor in an image pickup system using a single photo-taking lens, with the pitch of pixels of the solid-state image sensor assumed to be fixed, the pixel shifting method causes the size of the object image to become $1/\sqrt{4}$.

Then, the focal length of the photo-taking lens decreases to become approximately $1/\sqrt{4}=\frac{1}{2}$.

The pixel shifting method is, therefore, highly advantageous for the reduction in thickness of the camera.

The viewfinder device according to the first embodiment of the invention is next described. This viewfinder device is arranged by utilizing the totally-reflecting nature of light between a medium of a high refractive index and a medium of a low refractive index. In this case, the viewfinder device is arranged to be used in air.

Figure 10:
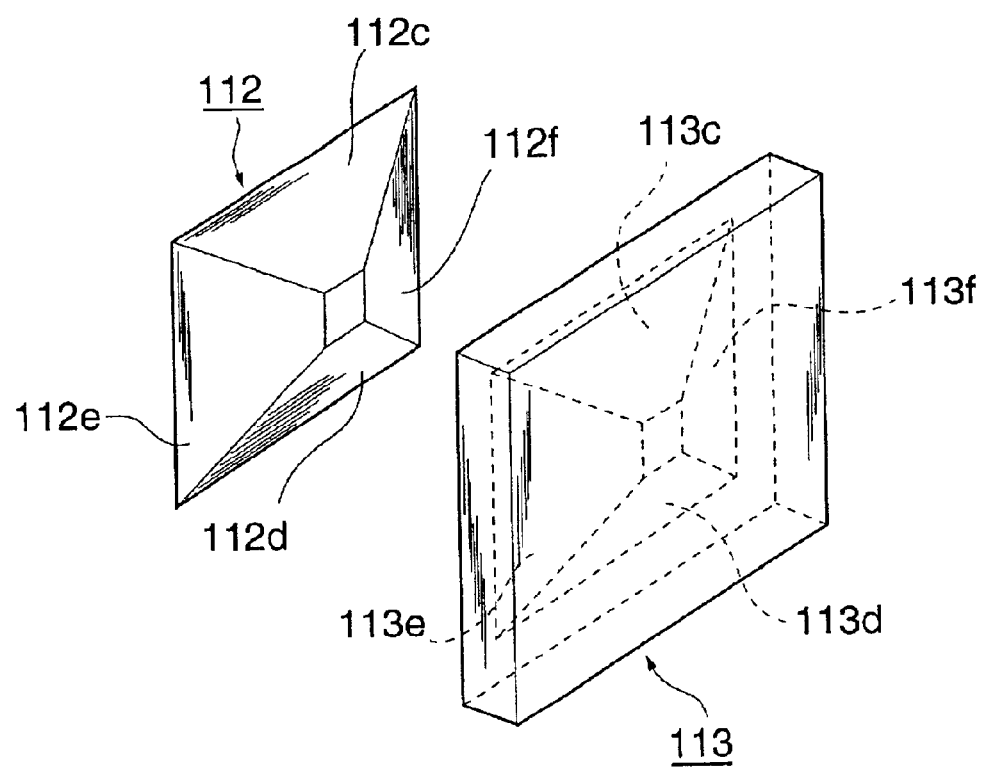
FIG. 10 is a perspective view showing a first prism 112 and a second prism 113, which constitute a viewfinder device.
Figure 11:
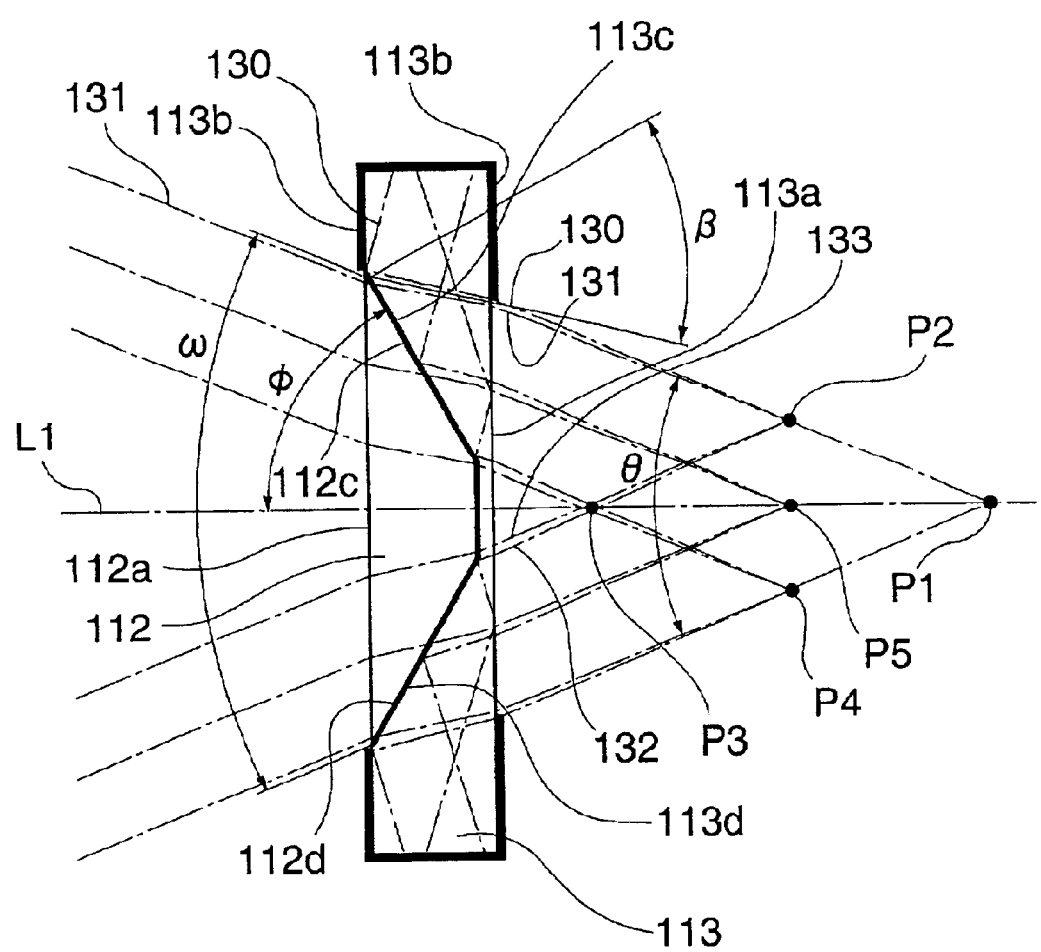
FIG. 11 is a sectional view showing a viewfinder system shown in FIG. 10.

FIG. 10 is a perspective view showing the first prism 112 and the second prism 113, which constitute the viewfinder device. FIG. 11 is a sectional view showing essential parts of the viewfinder device. As shown in FIGS. 10 and 11, the first prism 112 is a quadrangular pyramid with its apex cut away. The first prism 112 has four exit surfaces 112c, 112d, 112e and 112f in positions opposite to a surface (entrance surface) 112a. The light of an object incident on the surface 112a exits from the surfaces 112c, 112d, 112e and 112f. The square shape of the bottom surface and that of the top surface of the quadrangular pyramid are analogous to a photo-taking field frame, i.e., to the shape of the solid-state image sensor. All the surfaces 112a, 112c, 112d, 112e and 112f are flat surfaces.

On the other hand, the second prism 113 has surfaces 113c, 113d, 113e and 113f in positions opposed to the surfaces 112c, 112d, 112e and 112f of the first prism 112 and is in such a shape that a flat plate is obtained with the first and second prisms 112 and 113 joined together. The light of an object incident on the surfaces 113c, 113d, 113e and 113f exits from a surface 113a.

The surfaces 112c, 112d, 112e and 112f of the first prism 112 and the surfaces 113c, 113d, 113e and 113f of the second prism 113 are opposed to each other across a slight air gap. Accordingly, all the surfaces 113c, 113d, 113e and 113f are also flat surfaces.

Since the viewfinder is to be used for viewing some object by bringing an eye close thereto, the viewfinder system must be arranged to have no refractive power. Therefore, because of the object light entrance surface 112a of the first prism 112 being a flat surface, the object light exit surface 113a of the second prism 113 is also a flat surface.

In addition, these surfaces 112a and 113a are in parallel with each other. Further, the image pickup system 890 and the signal processing system are arranged to obtain a rectangular image as a result of a distortion correcting arithmetic operation. Therefore, the viewing field which is visible through the viewfinder must be arranged also in a rectangular shape. Hence, all of optically effective surfaces of the first and second prisms 112 and 113 are in a symmetric relation with respect to plane in the vertical and horizontal directions. A viewfinder optical axis L1 (FIG. 11) represents a line of intersection between the two planes of symmetry. In other words, the prism surfaces are set in such a manner that upper and lower surfaces are symmetric with respect to a horizontal plane including the viewfinder optical axis, while right and left surfaces are symmetric with respect to a vertical plane including the viewfinder optical axis.

FIG. 11 is a diagram for explaining roles played by the two prisms 112 and 113, which are opposed to each other across the air gap provided between them. A viewfinder system is formed by combining the first prism 112 and the second prism 113 in a predetermined positional relation. The viewfinder system is illustrated in a principal section thereof as viewed from above in a state obtained by reversely tracing the optical path from the position of the viewer's eye.

In FIG. 11, a point P1 represents the so-called eye point, which is located most away from the viewfinder and from which the whole viewing field can be seen with the pupil of the viewer's eye infinitely stopped down.

Considering a light ray 130 which comes from the point P1 at an angle slightly exceeding a viewfinder angle of view ω, the light ray 130 is refracted at the surface 113a of the second prism 113 to reach the surface 113c. The surface 113a is arranged to have such a slanting angle as to cause the incident angle β of a ray of light corresponding to the viewfinder angle of view ω to be a critical angle. The incident angle of the light ray 130 on the entrance surface 113c thus slightly exceeds the critical angle.

The relation of the slanting angle of the surface 113c to the critical angle is as follows. Assuming that, within the drawing plane of FIG. 11, an angle of field corresponding to the viewfinder angle of view ω is θ, the ray of light corresponding to the viewfinder angle of view ω is at an angle θ/2 with respect to the surface 113a.

The refractive index of the material of the first prism 112 is the same as that of the material of the second prism 113. With this refractive index assumed to be n, an angle α between the ray of light corresponding to the viewfinder angle of view ω and the viewfinder optical axis L1 within the second prism 113 is in the following relation to the refractive index n:

$$n \cdot \sin \alpha = \sin \theta/2 \quad (1)$$

Considering that the slanting angle φ of the surface 113c is an angle obtained with reference to the viewfinder optical axis L1, an angle β between a ray of light corresponding to the viewfinder angle of view ω and the surface 113c can be expressed as follows:

$$\beta = (90-\phi) + \alpha \quad (2)$$

With the viewfinder assumed to be used in air, a state of having the incident angle β coinciding with the critical angle can be expressed as follows:

$$n \cdot \sin \beta = 1 \quad (3)$$

From the above equations (1), (2) and (3), a relation among the angle φ, the refractive index n and the angle θ can be expressed by the following equation (4):

$$\phi = 90 + \sin^{-1}(1/n \cdot \sin \theta/2) - \sin^{-1} 1/n \quad (4)$$

Assuming that, for example, θ=45.6[°] and n=1.49171, the angle φ can be computed as φ=63[°] from the equation (4).

Again, considering the behavior of the ray of light 130, the ray of light 130 is at an angle slightly exceeding the viewfinder angle of view ω. Therefore, the ray of light 130 cannot exit from the surface 113c and is thus totally reflected. There is a printed area 113b on a side surface of the second prism 113. The reflected ray of light 130 is absorbed by the printed area 113b.

Therefore, no object is seen by the viewer in the direction of the ray of light 130, and there is obtained only a dark part showing the outside of the field.

The behavior of a ray of light 131 coming from the point P1 at an angle slightly smaller than the viewfinder angle of view ω is next described as follows. The ray of light 131 is refracted by the surface 113a of the second prism 113 to reach the surface 113c.

As mentioned above, the surface 113a is arranged to have such a slanting angle as to cause the incident angle β of a ray of light corresponding to the viewfinder angle of view ω to be a critical angle. The angle of incidence of the ray of light 131 on the surface 113c is slightly smaller than the critical angle. The ray of light 131 exits from the surface 113c to come to the surface 112c of the first prism 112 after passing through the slight air gap. Since the surface 112c of the first prism 112, which is opposed to the surface 113c, is in the same shape as the surface 113c, the ray of light 131 advances in the same direction within the first prism 112 as the direction in which it has advanced within the second prism 113.

The overall characteristic of the first prism 112 and the second prism 113 for the ray of light having reached the first prism 112 is equivalent to parallel flat plates.

Therefore, the ray of light 131 exits from the surface 112*a* at an angle which is equal to the angle of incidence on the surface 113*a*.

In other words, the angle of field θ and the viewfinder angle of view ω are equal to each other. Therefore, the viewer can see an object in the direction of the ray of light 131 and can see a photo-taking field.

The optical paths of the rays of light 130 and 131 described above indicate that the viewfinder field is limited by utilizing the critical angle, so that the contour of the viewfinder field can be clearly obtained.

Since the first prism 112 and the second prism 113 are in shapes which are symmetrical with respect to plane as mentioned above, some of optical paths shown in FIG. 11 are in a folded shape with respect to the viewfinder optical axis L1.

In respect of the relation of the surfaces 112*e* and 112*f* of the first prism 112 to the surfaces 113*e* and 113*f* of the second prism 113, limitation is imposed also on the viewfinder field by the same principle.

The above description is given, for the sake of simplification, by reversely tracing the rays of light from the viewer's eye position. Considering the reversibility of light, however, the above description is equivalent to describing the optical path of light in the direction of travel from a photo-taking object. With the optical path considered (traced) in this direction, the object light incident on the object light entrance surface 112*a* from within the viewing field comes to pass through the air gap. However, some of object light incident on the surface 112*a* from the outside of the viewing field does not come to pass the air gap.

The arrangement described above gives, as an overall viewfinder characteristic, an approximately rectangular viewfinder field as viewed from the position of the so-called eye point P1.

When the position of the viewer's eye moves, the state of the viewfinder device is as follows. In FIG. 11, a point P2 is on a ray of light corresponding to the viewfinder angle of view ω. The point P2 is located between the ray of light 130 which comes from the point P1 at an angle slightly exceeding the viewfinder angle of view ω and the ray of light 131 which comes from the point P1 at an angle slightly less than the viewfinder angle of view ω and is thus located at a very near distance. The rays of light 130 and 131, therefore, can be safely considered to come from the point P2. This means that the rays of light 130 and 131 are identical with each other in respect of the passing positions of the rays of light on the surface 113*c* of the second prism 113 and their reflecting and passing behaviors.

However, it is to be noted that, since the point P2 is not on the viewfinder optical axis L1, the rays of light must be separately considered as to how they appear on the opposite side of the viewfinder image plane. With respect to a ray of light 132 which comes from the point P2 at an angle slightly larger than the viewfinder angle of view ω, the ray of light 132 is refracted at the surface 113*a* of the second prism 113 to reach the surface 113*d*. As mentioned above, the slanting angle of the surface 113*d* is set in such a way that the incident angle β of a ray of light coming from the point P1 at an angle corresponding to the viewfinder angle of view ω becomes a critical angle.

However, since the surface 113*d* is a flat surface, an incident angle of a ray of light coming from the point P2 at an angle corresponding to the viewfinder angle of view ω coincides with the critical angle, although the position of its incidence of the ray of light differs from that of the ray of light coming from the point P1. Therefore, the ray of light 132 is totally reflected as its angle of incidence on the entrance surface 113*d* slightly exceeds the critical angle.

Meanwhile, a ray of light 133 which comes from the point P2 at an angle which is slightly less than the viewfinder angle of view ω is refracted at the surface 113*a* of the second prism 113 to reach the surface 113*d*. Since the angle of incidence on the surface 113*d* of the ray of light 133 is slightly less than the critical angle, the ray of light 133 exits from the surface 113*d* and passes through the air gap to be incident on the surface 112*d* of the first prism 112. Since the surface 112*d* which is opposed to the surface 113*d* is of the same shape as that of the surface 113*d*, the ray of light 133 advances within the first prism 112 in the same direction as within the second prism 113.

For a ray of light reaching the first prism 112, the overall characteristic of the first and second prisms 112 and 113 is equivalent to that of parallel flat plates. Therefore, the ray of light 113 exits from the surface 112*a* at the same angle as its angle of incidence on the surface 113*a*. As a result, the viewer is allowed to see a field of view as an object can be seen in the direction of the ray of light 133. The optical paths of the rays of light 132 and 133 mentioned above indicate that the viewfinder field remains unchanged event when the position of the eye of the viewer shifts.

Such being the behavior of rays of light, the viewfinder field is correctly viewable by setting the eye in a rhombic area defined by points P1, P2, P3 and P4.

In order to prevent an evanescent wave from propagating between the first and second prisms 112 and 113, the amount of the air gap used in the first embodiment must be at least twice as much as the wavelength of light. Considering the light within a visible spectrum, an amount of the air gap is computed by using a maximum wavelength in terms of luminosity factor. The result of computation is about 1.4 μm. Therefore, the leak of light into dark parts existing outside the viewing field can be completely prevented by setting the air gap at a value which is at least 1.4 μm. Further, in order to make the boundary of the viewfinder field clear, the air gap is preferably set at a value not exceeding 300 μm.

The digital color camera operates as follows. In using the camera for photo-taking, a contact protection cap which is arranged to protect the connection terminal 114 is fitted on the camera body 101. FIGS. 12(A), 12(B) and 12(C) show the whole digital color camera with the contact protection cap fitted thereon. Of these figures, FIG. 12(B) is a rear view. FIG. 12(A) is a side view of the camera taken from the left side of the rear view (FIG. 12(B)). FIG. 12(C) is a side view taken from the right side of the rear view (FIG. 12(B)).

In FIG. 12(C), reference numeral 200 denotes the contact protection cap. The contact protection cap 200 is made of either a soft plastic material or rubber. When the contact protection cap 200 is fitted on the camera body 101, the contact protection cap 200 functions as a grip of the camera to facilitate carrying the camera.

When the main switch 105 is turned on, a power supply voltage is supplied to each part of the camera to render the camera operative.

Next, a check is made for finding whether or not an image signal can be recorded on a memory. At this time, a number of frames for which pictures can be taken is indicated at the indicating part 150. The operator of the camera sees this indication. If photo-taking is thus found to be possible, the release button 106 is pushed with the camera directed toward a photo-taking field.

When the release button 106 is pushed just halfway of its full stroke of operation, the first step circuit of the switch 121 is closed to compute a length of time of exposure. Upon completion of all preparatory processes for photo-taking, the camera becomes ready for photo-taking. The operator (user) of the camera is then informed of the readiness. Then, when the release button 106 is pushed down to the end of its stroke, the second step circuit of the switch 121 is closed. With the second step circuit closed, an operation detecting circuit (not shown) sends a detection signal to a system control circuit. At that time, an exposure time which has been computed is counted until the lapse of it. Upon lapse of the exposure time, a timing signal is sent to a solid-state image sensor driving circuit. In accordance with the timing signal, the solid-state image sensor driving circuit forms horizontal and vertical driving signals. By these signals, all of the 800×600 pixels exposed to light are read serially one after another both in the horizontal and the vertical directions for all image pickup areas.

In this instance, the user or operator pushes the release button 106 by pinching the camera body 101 with the index finger and the thumb of the right hand in such a way as to hold the contact protection cap 200.

In FIG. 12(A), arrows A and B indicate the directions of forces exerted at this time. The arrow A indicates the acting point and the direction of a force of pushing the release button with the index finger. The arrow B indicates the acting point and the direction of a force of pushing the back cover 125 of the camera body 101 with the thumb.

If the acting points of the two forces are not on one straight line, as shown in FIG. 12(A), the camera body 101 would be caused to turn in the direction of an arrow D by the couple of forces. The couple of forces causes an image taken to blur, greatly lowering the quality of the image.

If the acting point of the force of pushing the release button 106 with the index finger and the acting point of the force of pushing the back cover 125 of the camera body with the thumb are on one straight line as indicated by arrows A and C as shown in FIG. 12(A), no couple of forces takes place to shake the camera.

In view of this, a projection 106a is provided integrally with the release button 106 on the axis L2 of the release button 106. Further, a projection 120 is provided on the back cover 125 at a position on a line obtained by extending the axis L2 of the release button 106, as shown in FIG. 12(A). This arrangement enables the operator to perform a shutter release operation by pushing the projection 106a with the index finger and the projection 120 with the thumb under the guidance of the projections 106a and 120. The occurrence of the couple of forces can be easily prevented in this manner to obtain an image with a high quality.

A viewfinder device according to a second embodiment of the invention is next described. The second embodiment is arranged in the same manner as the first embodiment except that the two prisms differ in shape from those of the first embodiment.

Figure 13:
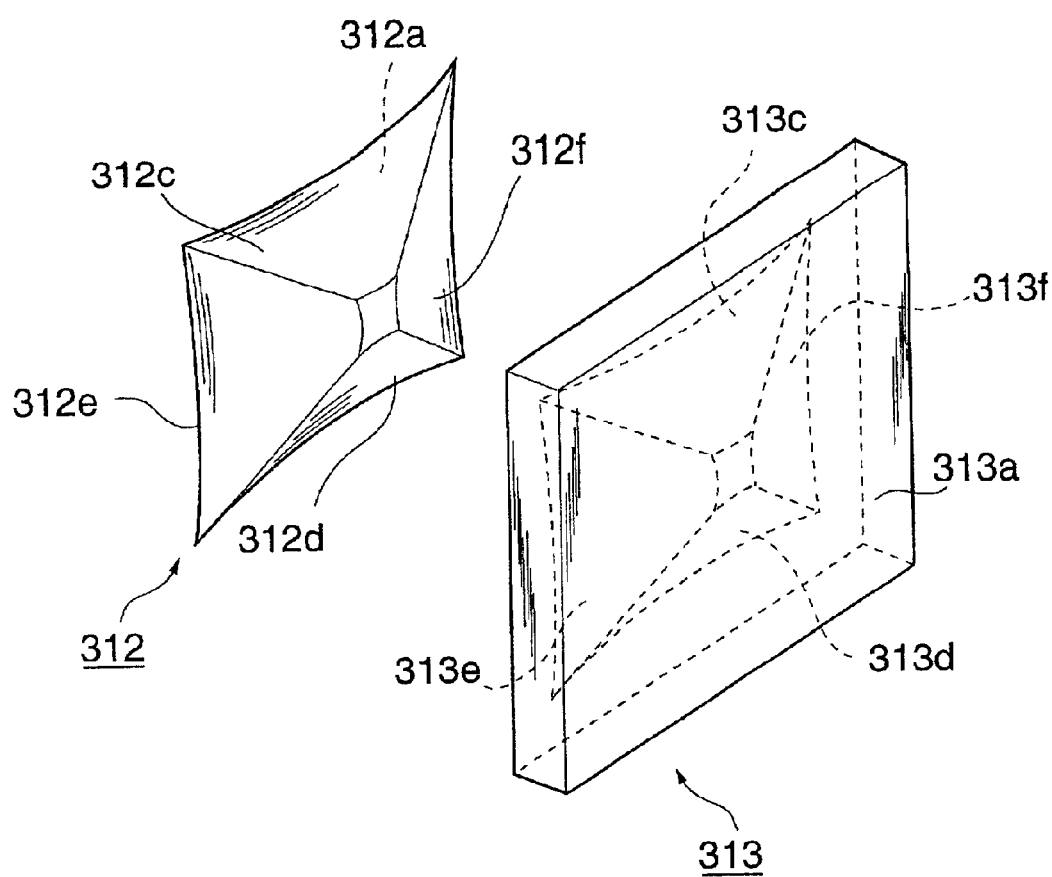
FIG. 13 is a perspective view showing a first prism 312 and a second prism 313 of a viewfinder device according to a second embodiment of the invention.

FIG. 13 shows in a perspective view a first prism 312 and a second prism 313 of the viewfinder device according to the second embodiment. The behaviors of rays of light on the principal sections of the first and second prisms 312 and 313 in the second embodiment are exactly the same as those of the first embodiment described above with reference to FIG. 11. In the second embodiment, skew rays which do not appear on the principal sections are handled differently from the first embodiment.

In the first prism 312, an object light entrance surface 312a is located at the same position as the object light entrance surface 112a of the first prism 112 in the first embodiment. The first prism 312 has four surfaces 312c, 312d, 312e and 312f at positions opposed to the surface 312a. Object light incident on the surface 312a exits from the four surfaces 312c, 312d, 312e and 312f. Each of the surfaces 312c, 312d, 312e and 312f is a curved surface with the behavior of skew rays taken into consideration. The skew rays are not on the drawing plane of FIG. 11 which is used for the description of the first embodiment. In other words, the skew rays are rays of light not existing on the principal section of the prism.

The second prism 313 has surfaces 313c, 313d, 313e and 313f at positions opposed respectively to the surfaces 312c, 312d, 312e and 312f of the first prism 312. Object light incident on the surfaces 313c, 313d, 313e and 313f exits from a surface 313a.

The surfaces 312c, 312d, 312e and 312f of the first prism 312 are opposed respectively to the surfaces 313c, 313d, 313e and 313f of the second prism 313 across a slight air gap.

Therefore, the surfaces 313c, 313d, 313e and 313f of the second prism 313 have curved shapes which are the same as the curved shape of the surfaces 312c, 312d, 312e and 312f of the first prism 312. The object light entrance surface 312a of the first prism 312 and the object light exit surface 313a of the second prism 313 are flat surfaces which are in parallel with each other. Further, all optically-effective surfaces of the first prism 312 and the second prism 313 are in a symmetric relation with respect to plane in both the vertical and lateral directions.

Figure 14:
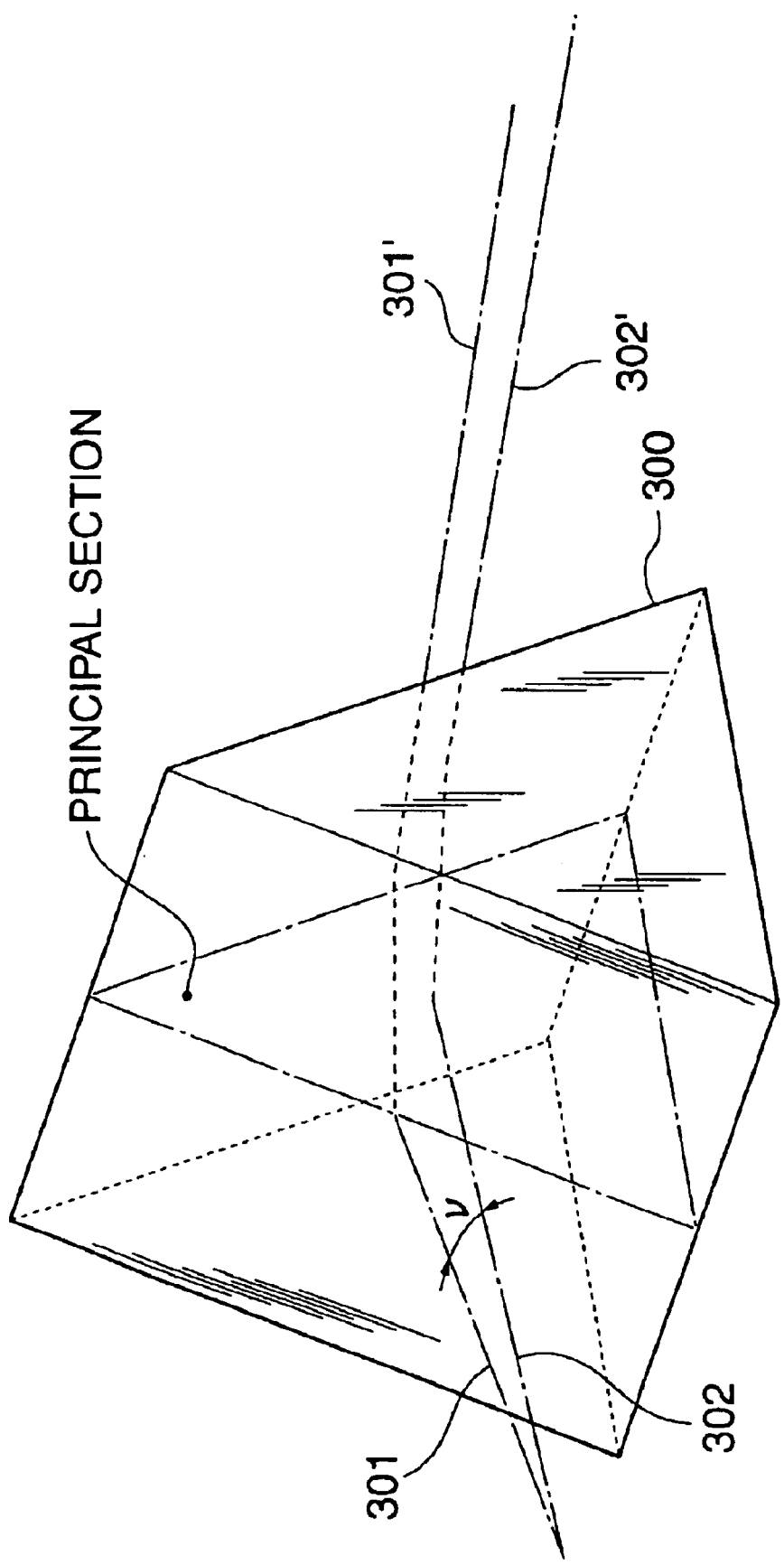
FIG. 14 is a perspective view for explaining the state of refraction of rays of light obliquely incident on an ordinary prism.
Figure 15:
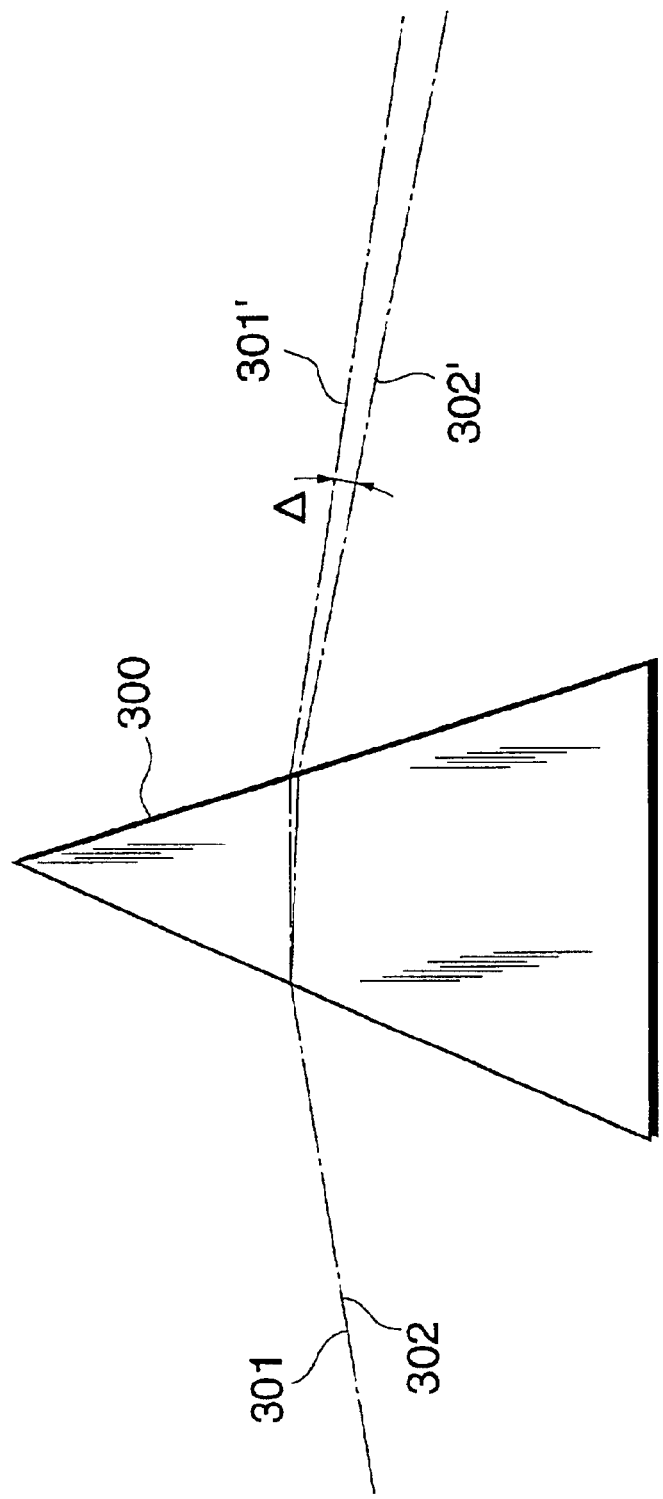
FIG. 15 is a projected plan view of rays of light on a principal section, for explaining the state of refraction of rays of light obliquely incident on the ordinary prism.

Skew rays behave as follows. FIGS. 14 and 15 are diagrams for explaining the state of refraction of rays of light obliquely incident on an ordinary prism. FIG. 14 is a perspective view and FIG. 15 is a projected plan view showing rays of light projected on the principal section.

In FIGS. 14 and 15, reference numeral 300 denotes a prism. Reference numeral 301 denotes a ray of light within the principal section. Reference numeral 302 denote a ray of light within a plane perpendicular to the principal section including the ray of light 301. In other words, the ray of light 302 represents skew rays. The rays of light 301 and 302 are assumed to be at an angle v with respect to each other.

A ray obtained after the ray of light 301 is refracted within the principal section is expressed as a ray 301'. A ray obtained after the skew ray 302 is refracted is expressed as a ray 302'. When the skew rays are projected on the principal section on which the rays of light 301 and 301' exist, they become as shown in FIG. 15. In other words, skew rays are refracted in such a manner that the prism 300 appears as if its refractive index is increased.

With the true refractive index of the material of the prism expressed as n, and the apparent refractive index obtained by the skew rays expressed as n', it is known that there is a relation expressed by the following formula (5):

$$n' \approx n + (n^2-1)/(2n) \cdot v^2 \qquad (5)$$

As a result, an increase Δ in deflection angle increases in proportion to the square of the angle v. With this behavior of rays of light applied to the first embodiment shown in FIG. 1, the apparent refractive index increases accordingly as viewing parts come closer to the corners of the viewfinder field. Therefore, the angle of incidence on the surfaces 113c, 113d, 113e and 113f becomes smaller when the rays of light are projected on the principal section. However, at the real angle of incidence on the surfaces 113c, 113d, 113e and 113f, an obliquely incident component is dominant. As a result, a margin with respect to the critical angle becomes smaller accordingly as the angle of view is larger, from an overall viewpoint. Strictly speaking, therefore, the viewfinder field is not rectangular but is somewhat deformed into a barrel-like shape.

The second embodiment is arranged to solve this problem. For this purpose, in the second embodiment, the surfaces 312c, 312d, 312e and 312f of the first prism 312 and the surfaces 313c, 313d, 313e and 313f of the second prism 313 are formed to be curved surfaces. The shapes of the surfaces 313c, 313d, 313e and 313f are set in such a way that, with rays of light reversely traced from an eye point P1 having the eye at the point P1, all the rays of light reaching any parts of the viewfinder field are incident at a fixed angle on the surfaces 313c, 313d, 313e and 313f of the second prism 313.

More specifically, the surfaces of the first prism 312 are formed in convex shapes and the surfaces of the second prism 313 are formed in concave shapes in such a manner that the deviation of the shapes of the surfaces 313c, 313d, 313e and 313f from the flat surfaces 113c, 113d, 113e and 113f increases accordingly as they are located closer to the periphery of the viewfinder field.

Reversely tracing the rays of light, a ray of light exiting from the second prism 313 comes into the first prism 312 through the air gap. For the rays reaching the first prism 312, the overall characteristic of the first prism 312 and the second prism 313 is equivalent to parallel flat plates. Therefore, the rays of light exit from the first prism 312 at an angle which is equal to the angle of incidence on the surface 313a in the same manner as in the case of the first embodiment.

Considering the optical path in the direction in which the light coming from the object of photo-taking advances, the reversibility of rays of light allows the object light incident on the object light entrance surface 312a of the first prism 312 from within the viewing field to pass through the air gap but does not allow such object light that is incident on the object light entrance surface 312a of the first prism 312 from the outside of the viewing field to pass through the air gap.

In addition to the above-stated behavior, the surfaces 312c, 312d, 312e, 312f, 313c, 313d, 313e and 313f are formed aslant in such a manner that the object light incident on the object light entrance surface 312a of the first prism 312 from within the rectangular viewing field is allowed to pass through the air gap, whereas such object light that is incident on the object light entrance surface 312a of the first prism 312 from the outside of the viewing (or visual) field is prevented from coming to pass through the air gap.

The arrangement of the second embodiment thus enables the viewfinder device to have, as an overall viewfinder characteristic, a rectangular viewfinder field as viewed from the position of the point P1.

Figure 16:
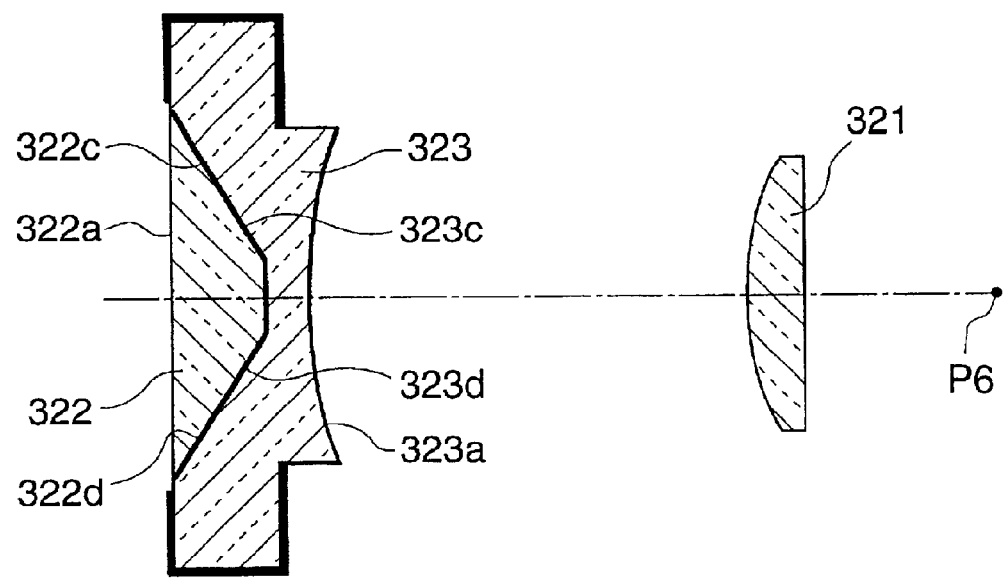
FIG. 16 is a sectional view for explaining an inverted Galilean viewfinder device according to a third embodiment of the invention.

Next, a viewfinder device according to a third embodiment of the invention is next described. Generally, an inverted Galilean viewfinder gives a bright viewfinder field with simple structural arrangement. However, the viewfinder of this kind has a shortcoming in that the contour of the field is vague and unclear. FIG. 16 shows in outline the essential parts of the third embodiment. The third embodiment is arranged to add a function of making the contour of the viewfinder field clear to an inverted Galilean viewfinder.

Referring to FIG. 16, the viewfinder device includes a convex lens 321, a first prism 322 and a second prism 323. The first and second prism 322 and 323 are combined together in the same manner as in the case of the first or second embodiment. In other words, the slanting surfaces of the same shape are opposed to each other across an air gap.

The convex lens 321 is combined with the concave surface 323a of the second prism 323 in a manner similar to the ordinary inverted Galilean viewfinder. Therefore, considering rays of light by reversely tracing their optical paths with the eye set at a point P6, a ray of light which passes the point P6 at an angle γ with an optical axis comes to pass through the convex surface 323a and, after that, comes to be incident on the surface 323c or 323d of the second prism 323 at an angle obtained by multiplying the angle γ by a constant.

The passage of rays of light between the second prism 323 and the first prism 322 is similar to the passage of light between the prisms of the first or second embodiment. Therefore, angular limitation can be imposed on the passing rays of light by using a critical angle.

More specifically, the slanting surfaces 322c, 322d, 323c and 323d of the first and second prisms 322 and 323 are arranged to have their angles set in the following manner. The object light incident on the object light entrance surface 322a of the first prism 322 from within the viewing field passes through the air gap. Some of object light which is incident on the object light entrance surface 322a of the first prism 322 from the outside of the viewing field does not pass through the air gap.

With the nature of the critical angle applied to the prisms as mentioned above, the third embodiment can clearly show the boundary of the viewfinder field while taking the advantage of the inverted Galilean viewfinder. While the visual field angle θ and the viewfinder angle of view ω are equal to each other in the first embodiment, the third embodiment is arranged to have the visual field angle smaller than the viewfinder angle of view.

In other words, the field of view can be seen in a reduced state. The arrangement of the third embodiment is, therefore, advantageous in combining the viewfinder device with an image pickup system having a relatively large visual field angle.

Figure 17:
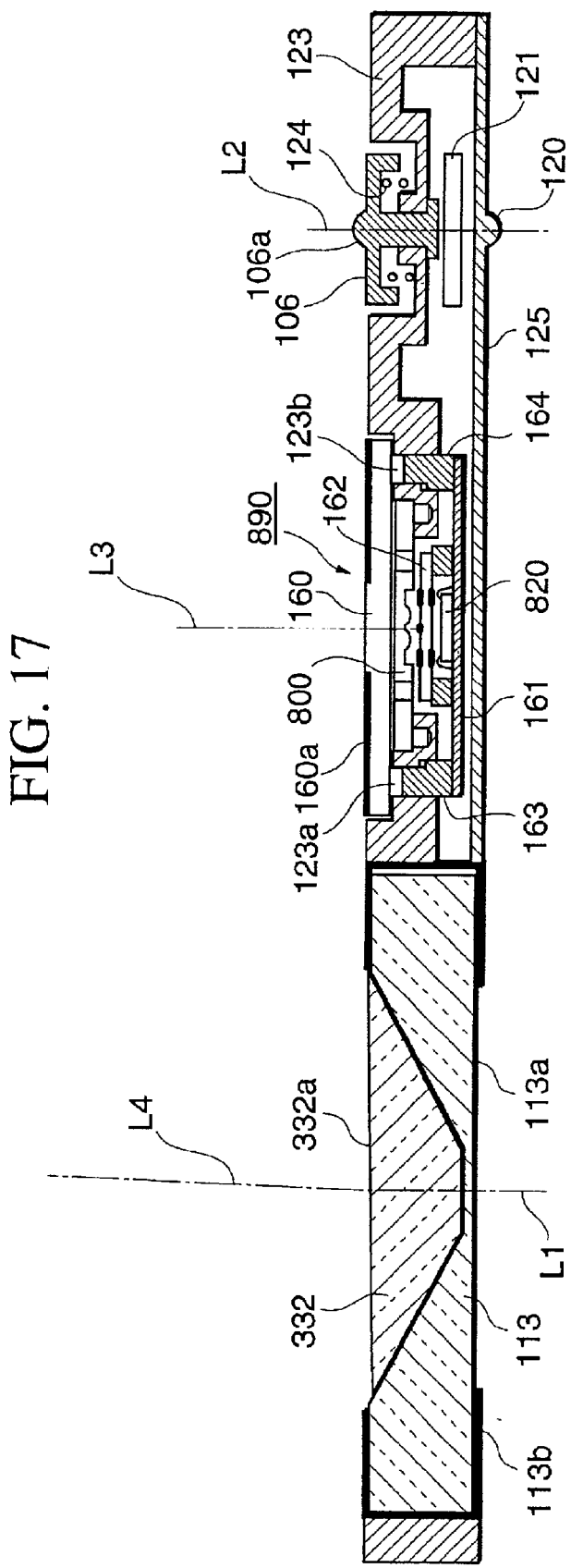
FIG. 17 is a sectional view showing essential parts of a viewfinder device according to a fourth embodiment of the invention.

Next, a fourth embodiment of the invention is described. FIG. 17 shows in a sectional view a digital color camera according to the fourth embodiment. All parts that are the same as those of the first embodiment are indicated by the same reference numerals.

The fourth embodiment differs from the first embodiment in that the viewfinder optical axis is aslant in the case of the fourth embodiment. Referring to FIG. 17, an image pickup system 890 is arranged to capture the object of photo-taking with an axis L3 used as a center. At this time, with the object distance assumed to be 1 m for instance, the parallax of the viewfinder can be minimized by arranging a viewfinder optical axis L4 to intersect the axis L3 of the image pickup system 890 at a distance of 1 m.

In the case of the fourth embodiment, the parallax is minimized by slanting a surface 332a of a first prism 332. The inclination e of the optical axis L4 can be expressed as a relation between the inclination angle η of the surface 332a and the refractive index n of the first and second prisms 332 and 113 by the following formula (6):

$$\epsilon = (n-1)\cdot\eta \tag{6}$$

Assuming that the refractive index n is 1.5, the angle of inclination ε of the optical axis L4 is ½ of the angle of inclination η of the surface 332a.

In each of the first to fourth embodiments, a viewfinder device which is composed of first and second prisms which are arranged to be opposed to each other across a uniform air gap. The inclination angles of the prisms are arranged such that the object light incident on the light entrance surface of the first prism from within a viewing field is allowed to pass through the air gap, while a part of the object light incident on the light entrance surface of the first prism from the outside of the viewing field is not allowed to pass through the air gap.

The arrangement disclosed permits a viewfinder device of a thin shape to be arranged apposite to a card-shaped camera of the kind having no moving part.

According to the invention, a viewfinder device can be arranged to give a viewfinder field with a clear contour while the viewfinder device ensures a bright visual field (viewfinder image) without using any half-mirror.

According to the invention, a viewfinder device can be arranged to have a clear contour of a viewfinder field despite of its simple structure without using any Porro prism or the like.

Another advantage of the invention lies in that, by arranging the air gap to measure at least 1.4 μm, the leak of light into a dark part indicating the outside of the field of view can be reliably prevented while the contour of the viewfinder field is clearly shown.

With the component elements of the viewfinder device set as described above, a thin viewfinder device having no moving part and an optical apparatus using the thin viewfinder device can be adequately arranged according to the invention.

Further, the invention gives a thin viewfinder device which is capable of brightly and clearly showing the contour of a viewfinder field without any moving part and an optical apparatus using the thin viewfinder device.

What is claimed is:

1. A viewfinder device, comprising, in order from an object side to a viewing eye side:
    a first prism having a convex portion facing the viewing eye side; and
    a second prism disposed separately from said first prism across an air gap,
    wherein an object light flux obtained within a viewing field passes through said first prism, said air gap and said second prism so as to reach the viewing eye, while an object light flux obtained outside the viewing field is totally reflected by the convex portion of said first prism so as to be prevented from reaching the viewing eye.

2. A viewfinder device according to claim 1, wherein a part of said second prism on the object side has a concave portion which is analogous in shape to the convex portion of said first prism.

3. A viewfinder device according to claim 1, wherein a composite optical power of said first prism and said second prism is nonpower.

4. A viewfinder device according to claim 1, wherein a surface of said first prism facing the object side is a flat surface, and a surface of said first prism facing said air gap has a flat top surface and four side surfaces forming a roof part in conjunction with the flat top surface, said four side surfaces being arranged to totally reflect the object light flux obtained outside the viewing field.

5. A viewfinder device according to claim 4, wherein each of said side surfaces is a curved surface.

6. A viewfinder device according to claim 5, wherein said side surfaces are in such shapes that are symmetrical with respect to a horizontal plane including a viewfinder optical axis.

7. A viewfinder device according to claim 5, wherein said side surfaces are in such shapes that are symmetrical with respect to a vertical plane including a viewfinder optical axis.

8. A viewfinder device according to claim 4, wherein each of said side surfaces is a flat surface.

9. A viewfinder device according to claim 1, wherein said air gap measures 1.4 μm or more in thickness.

10. A viewfinder device according to claim 1, wherein said first prism is a hexahedron in such a shape that a surface of said first prism facing the object side is in a square shape, and a top surface of a side of said first prism facing said air gap is in a square shape smaller in size than the square shape of the surface facing the object side.

11. A camera comprising a viewfinder device according to claim 1.

* * * * *

UNITED STATES PATENT AND TRADEMARK OFFICE
CERTIFICATE OF CORRECTION

PATENT NO. : 6,903,774 B2
DATED : June 7, 2005
INVENTOR(S) : Yasuo Suda

It is certified that error appears in the above-identified patent and that said Letters Patent is hereby corrected as shown below:

Column 14,
Line 51, delete "$n \approx +(n^2-1)/2n) \cdot v^2$" and insert -- $n \approx n+(n^2-1)/2n) \cdot v^2$ --.

Signed and Sealed this

Fourteenth Day of February, 2006

JON W. DUDAS
*Director of the United States Patent and Trademark Office*